March 20, 1962 — M. M. NYBORG — 3,026,403
BUTT WELDER

Filed March 9, 1959 — 5 Sheets-Sheet 1

INVENTOR.
MEREDITH M. NYBORG
BY
ATTORNEY

INVENTOR.
MEREDITH M. NYBORG
BY
ATTORNEY

INVENTOR.
MEREDITH M. NYBORG

March 20, 1962 M. M. NYBORG 3,026,403
BUTT WELDER

Filed March 9, 1959 5 Sheets-Sheet 5

INVENTOR.
MEREDITH M. NYBORG
BY
ATTORNEY

United States Patent Office 3,026,403
Patented Mar. 20, 1962

1

3,026,403
BUTT WELDER
Meredith M. Nyborg, 517 W. Highland Drive,
Camarillo, Calif.
Filed Mar. 9, 1959, Ser. No. 798,221
11 Claims. (Cl. 219—57)

This invention pertains to new and improved butt welders.

Although a large number of different butt welders have been designed and used in the past, there is a very definite need for new and improved devices of this category which are capable of producing consistent, high quality uniform welds at high production rates and at a low unit cost. A broad object of the present invention is to provide new and improved manually operated butt welders meeting this need. A related general object of this invention is to provide butt welders which are more advantageous commercially than other prior related units.

More specifically an object of the present invention is to provide manually operated butt welders with which the welding pressure may be adjusted as may be desired. Another object of this invention is to provide new and improved butt welders having low inertia as far as a moving part of the welding apparatus is concerned. A further object of this invention is to provide butt welders in which means are provided for automatic positioning of a wire being welded. Another specific object of the present invention is to provide butt welders utilizing an inert atmosphere surrounding the parts being welded. A still further object of the invention is to provide welding grips in a butt welder, the positions of which grips are capable of being adjusted as may be required in use so as to obtain a long effective life for these parts. A still further specific object of this invention is to provide a butt welder using replaceable part grips.

Because of the nature of this invention it is not considered necessary to specifically set forth in this specification a further long list of other objects and advantages of this invention. Such other objects and advantages of the invention will be fully apparent to those skilled in the art to which the invention pertains from a detailed consideration of the remainder of this description including the appended claims and the accompanying drawings in which:

Figure 1:
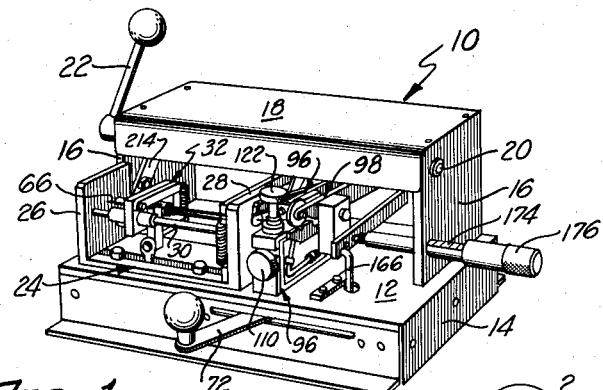
FIG. 1 is a perspective view of a butt welder of this invention.

The accompanying drawings are primarily intended so as to clearly illustrate a presently preferred embodiment or form of this invention. Those familiar with butt welding will realize however, that the precise sizes and shapes of various parts of this butt welder illustrated may be changed in accordance with routine engineering skill and practice without altering or departing from the essential nature of this invention as herein described and explained.

As an aid to understanding this invention it may be stated in essentially summary form that it concerns butt welders, each of which is built so as to include a fixed grip unit, a movable grip unit, a wire feed unit, these units being connected together by various operative means as herein described so that they are capable of being operated in conjunction with one another. With this type of construction a member to be welded may be secured to the movable grip unit and a wire to be welded to this member may be held with the wire feed unit and advanced from it to the fixed grip unit which holds this wire as a weld is being made. Further, means are provided for cutting off the wire after it has been moved from the wire feed unit to the fixed grip unit. A number of other individual operative parts are incorporated within a butt welder of this invention.

Construction

The actual nature of a butt welder of the present invention is best determined by referring directly to the accompanying drawings in which there is shown a butt welder 10. This welder 10 includes a floor 12 to which there is attached a dependent skirt 14 serving as a base. Parallel bearing plates 16 are attached to the floor 12 so as to extend therefrom. During the normal use of the welder 10 these plates 16 serve to hold a cover 18.

A shaft 20 serving as a cam shaft as hereinafter explained is rotatably mounted upon the plates 16. A handle 22 is attached to this shaft 20 for use in turning it. Whenever convenient for purposes of explanation this handle 22 may be referred to hereinafter as a cam shaft lever and the shaft 20 may be referred to as a cam shaft.

Figure 7:
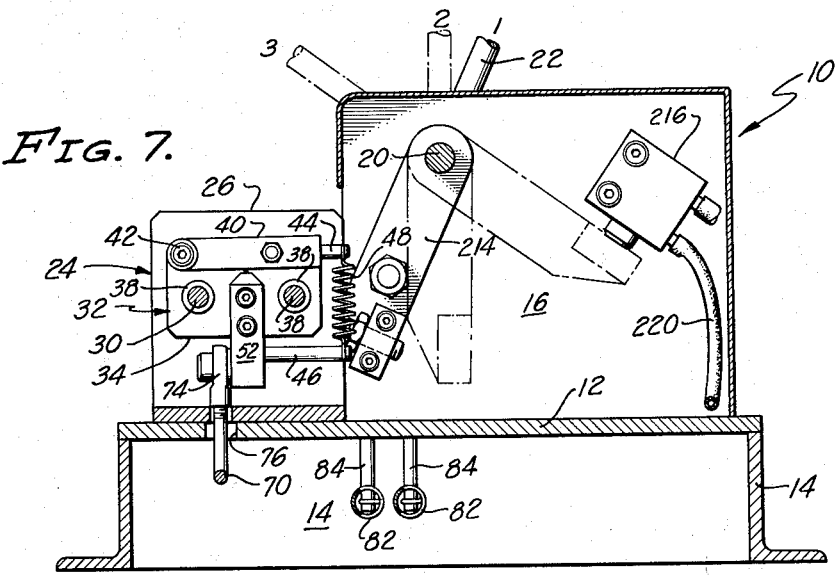
FIG. 7 is a cross-sectional view taken at line 7—7 of FIG. 4.

With the welder 10 a wire feed unit 24 is adjustably mounted on the floor 12 so that its position on the floor 12 may be varied somewhat as may be desired during the use of the complete welder 10. This unit 24 includes parallel end plates 26 and 28 which are interconnected by parallel guide rods 30. A wire feed carriage 32 (note FIGS. 5 and 7) is mounted between the plates 26 and 28. This carriage 32 consists of several plates 34 (FIG. 5) secured together by screws 36. The plates 34 are formed so as to include bearing openings 38 (FIG. 7) in which the rods 30 are located. The carriage 32 also includes a clamping jaw 40 (FIG. 7) which is mounted by means of a pivot pin 42 upon one of the plates 34; the jaw 40 includes a projecting arm 44. This arm 44 is attached to another arm 46 rigidly secured to one of the plates 34 by means of a spring 48.

Figure 4:
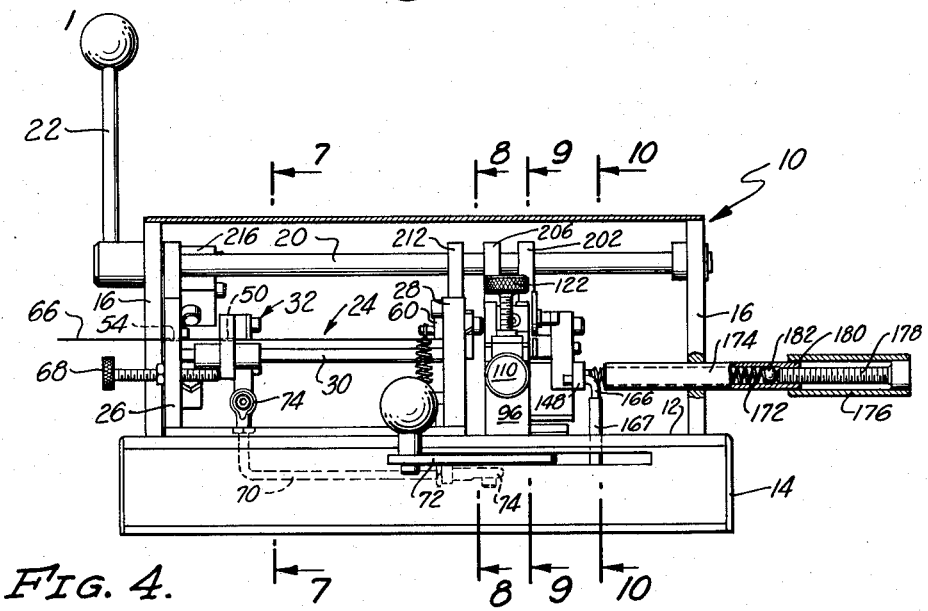
FIG. 4 is a front elevational view of this welder with the cover removed.

The plates 34 are formed so as to include a small hole 50 (FIG. 5) and a fixed jaw 52. Also, the end plate 26 is formed so as to include a small hole 54 (FIG. 4) which is aligned with the hole 50; a bushing 55 (FIG. 5) having a hole 57 in it is mounted upon the plate 28. This hole 57 is aligned with the holes 50 and 54. Another fixed jaw 56 is mounted upon the end plate 28. A movable clamping jaw 58 (FIG. 5) is mounted immediately above the jaw 56 upon an arm 60, which arm 60 carries a bushing 61 which in turn pivots on a bolt 62 carried by the plate 28.

The entire wire feed unit 24 previously described is intended to be used in holding a wire 66 and in advancing this wire automatically during the use of the welder 10. It will be seen from a detailed examination of the drawings that this wire 66 extends through the holes 50, 54 and 57 and is adapted to be held in place with respect to the carriage 32 by means of the clamping jaw 40 being brought against the jaw 52 through the operation of the spring 48. The wire 66 is also adapted to be held in position by means of the clamping jaw 58 moving toward the jaw 56. If desired, it is possible to provide in the wire feed unit 24 a bolt 68 (FIGS. 3 and 4) which is threadably attached to the end plate 26 and which is adapted to bear against the carriage 32 so as to limit the movement of this carriage with respect to this end plate.

Figure 5:
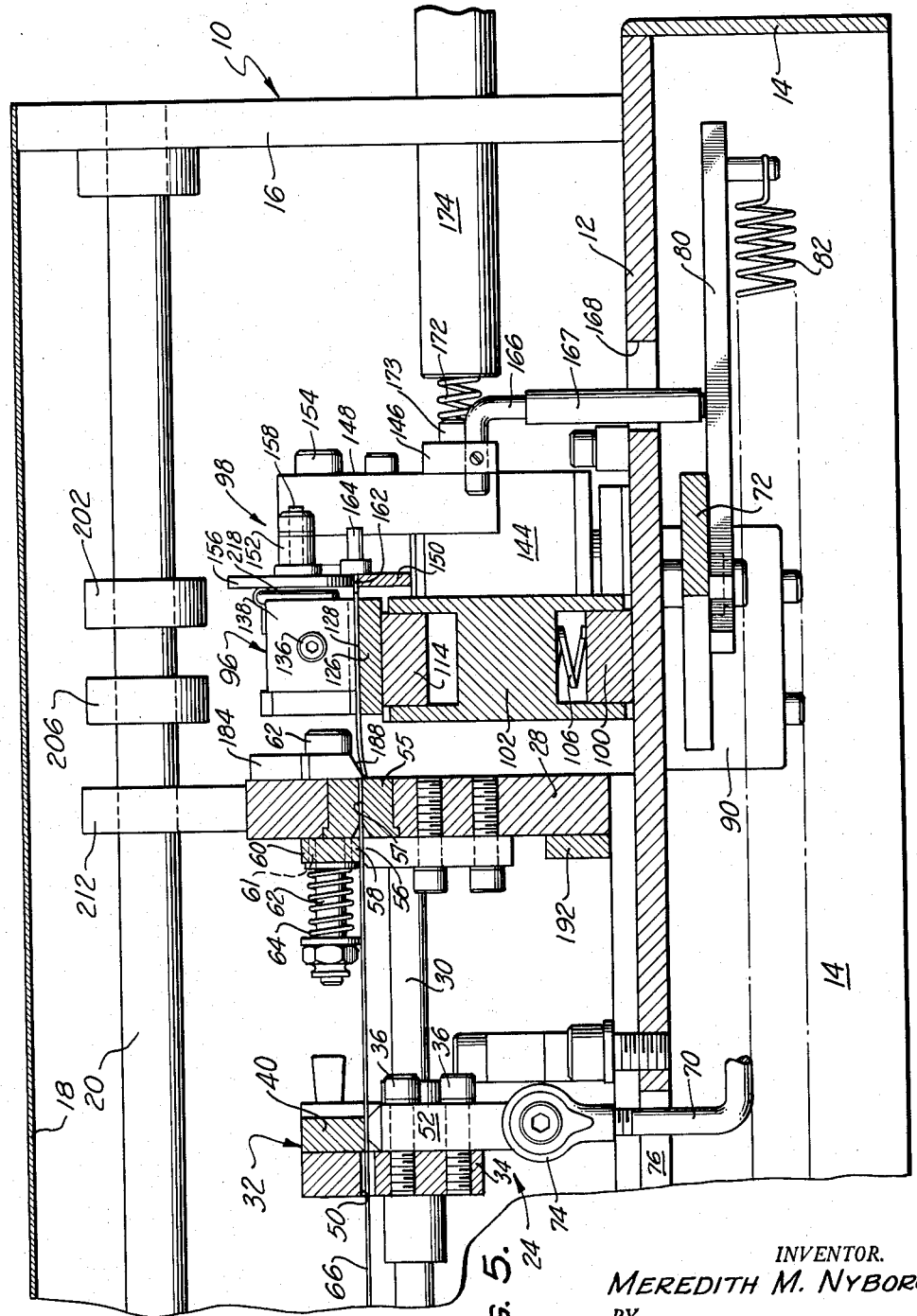
FIG. 5 is a partial cross-sectional view taken at line 5—5 of FIG. 2 showing parts of the butt welder in an operative, or actuated position.
Figure 6:
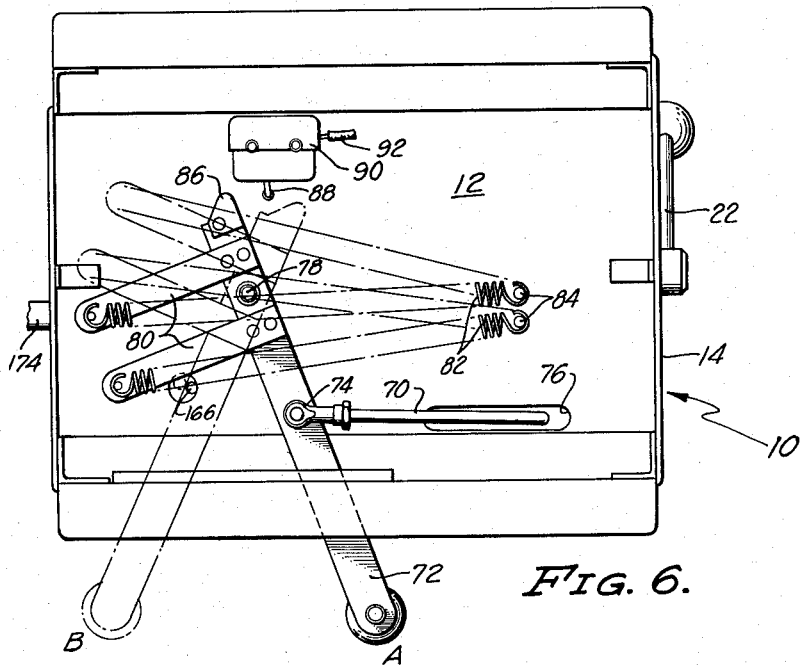
FIG. 6 is a bottom plan view of this welder.

The carriage 32 is connected by means of a bent link 70 to a wire feed lever 72. Pivotal connections 74 of a known type are used in attaching this lever 72 to both the carriage 32 and the lever 72. As is best seen in FIGS. 5 and 6 of the drawings the link 70 extends through an opening 76 in the floor 12, and the lever 72 is mounted generally within the skirt 14 on the underside of this floor 12.

The lever 72 is mounted so as to be capable of rotating about a pin 78 (FIG. 6) attached to the floor 12; it carries projecting arms 80 which extend at right angles to it on each side of the pin 78. The extremities of the arms 80 are connected by means of coil springs 82 to projections 84 extending from the floor 12. These springs 82 co-act with the lever 72 so as to form what may be considered an over center type of toggle preventing the lever 72 from being stopped in an unwanted or undesired position as it is moved from one location to another during the operation of the welder 10.

An end 86 of the lever 72 is formed as a small cam surface. This end is adapted to bear against an arm 88 extending from a conventional micro switch 90 (FIG. 6) secured to the under surface of the floor 12 in order to actuate this switch so as to permit current to flow in carrying out a welding operation using the welder 10. The switch 90 is connected to a power source (not shown) of a known variety through a wire 92, and from it wires 94 used in supplying current during the welding operation extend through the floor 12. The switch 90 is of such a nature that the arm 88 only actuates this switch when engaged by the end 86 as the lever 72 is rotated in one direction.

Figure 9:
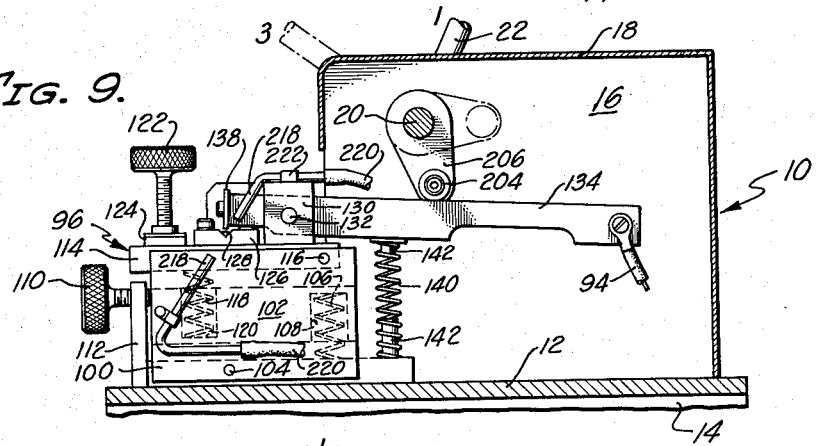
FIG. 9 is a cross-sectional view taken at line 9—9 of FIG. 4.
Figure 10:
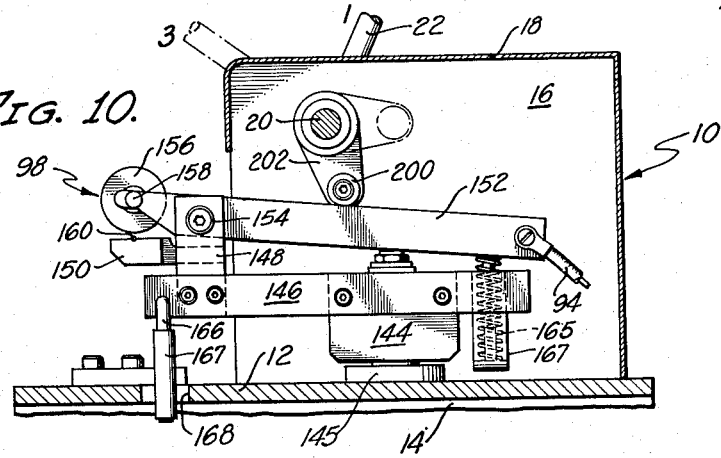
FIG. 10 is a cross-sectional view taken at line 10—10 of FIG. 4

One of the wires 94 is connected to a fixed grip unit 96; another is connected to a movable grip unit 98. The constructions of these grip units 96 and 98 are best seen in FIGS. 9 and 10 of the drawing, respectively. The fixed grip unit 96 is spaced from the end plate 28 of the wire feed unit 24 and includes a base 100 mounted upon the floor 12. A movable support 102 is mounted upon this base 100 by means of a pivot pin 104. A coil spring 106 extends into a cavity 108 within the support 12; the spring 106 is under compression and bears against the end of this cavity and against the base 100. Movement of the support 102 is controlled by means of a screw 110 threadably mounted upon an arm 112 extending from the base 100. As shown this screw 110 bears against the support 102.

A further support 114 is pivotally mounted on the support 102 by means of another pivot pin 116. The position of the support 114 is similarly attached by means of another coil spring 118 located under compression in a cavity 120 in the support 102 so as to bear against both the supports 102 and 114. The position of the support 114 is also controlled by means of another screw 122 threaded into the support 102 (FIG. 9). A spherical shoulder 124 on the screw 122 engages the support 114.

The support 114 carries a block 126 having a V-shaped notch 128 located therein. As indicated in FIG. 5 of the drawings this notch 128 is normally positioned so as to be aligned with the wire 66 extending through the wire feed unit 24 so that a wire may be automatically slid into position within it as the wire feed unit 24 is actuated. A small arm 130 extending from the support 114 carries, through the use of a pivot pin 132, a control arm 134, formed out of a conductive metal. One of the wires 94 is attached directly to an end of this arm 134. The other end of the arm 134 carries, through the use of a screw 136 (FIG. 5) a square, metal clamping electrode 138.

This construction is designed so that the position of the arm 134 may be changed in order to bring the electrode 138 against the wire 66 located within the notch 128 in order to firmly clamp this wire in this position. With this construction the electrode 138 may be turned so that any of its edges may be used in clamping in case any one of its edges becomes pitted or the like through use. Preferably a coil spring 140 under compression is located between the arm 134 and the floor 12 in order to resiliently bias the arm 134 in a clamping position. If desired, small rods 142 may be attached to the arm 134 and the floor 12 in order to aid in maintaining the position of the spring 140.

The movable grip unit 98 (FIGS. 5 and 10) is built so as to be carried upon a ball bearing 144 mounted upon the floor 12 using a non-conductive mounting 145. From this bearing 144 there projects a lever arm 146 to which there is attached a bracket 148. A fixed jaw 150 is secured to the bracket 148 so as to extend from this bracket. A metal lever arm 152 is mounted upon the bracket 148, through the use of a pivot pin 154 so as to extend from this bracket. One of the wires 94 is secured to an end of the arm 152. A small disc-like metal electrode 156 is secured to the other end of the arm 152 through the use of a pivot pin 158 in such a manner that this electrode 156 may be rotated as desired and is maintained in constant electrical contact with the arm 152.

This construction is designed so that the arm 152 may be rotated in order to clamp within a small notch 160 (FIG. 10) in the fixed jaw 150 a member 162 (FIG. 5) to be welded to the wire 66. As shown in the drawing this member 162 may be a wire lead extending from a small electrolytic capacitor 164 (FIG. 5), but obviously any desired part or member may be held by the movable grip unit 98. The electrode 156 may be turned as may be desired, as when this electrode becomes pitted from use, so as to always present a "fresh" clamping surface. The electrode 156 is biased toward the jaw 150 by a coil spring 165 (FIG. 10) under compression connecting the arm 152 and the arm 146. This spring 165 is carried by a bracket 167 extending from the arm 146.

The motion of the movable grip unit 98 is controlled using the arm 146. One end of the arm 146 (FIG. 10) is attached to a rod 166 extending through an opening 168 in the floor 12. This rod 166 is covered by an electrically non-conductive tubing 167. The rod 166 is adapted to be engaged by the wire feed lever 72 as hereinafter explained.

During the use of the welder 10 the movable grip unit 98 is urged toward the fixed grip unit 96 by means of a coil spring 172 (FIG. 4) located within a tube 174 mounted upon a bearing plate 16. The end of the spring 172 bears against an electrically non-conductive boss 173 (FIG. 5) attached to the arm 146. The tension upon the spring 172 may be adjusted as desired by turning a handle 176 so as to rotate a bolt 178 attached to this handle through a threaded end 180 of the tube 174, bringing the end of the bolt 178 against a small ball 182 which in turn bears against the spring 172.

The welder 10 also includes means for cutting off the wire 66 in order to obtain the desired length of wire welded to a part, such as the capacitor 164. This means is mounted upon the end plate 28 forming a part of the wire feed unit 24 and, in effect, constitutes a part of this unit 24 although its function is separate from the function of this unit 24. This cutting means comprises a lever arm 184 (FIG. 8) mounted by means of the pivot pin 62 on the plate 28. An end of this arm 184 immediately above the wire 66 is provided with a cutting edge 188 designed to sever the wire 66 squarely as the welder 10 is operated. If desired, a separate, easily replaced cutter may be mounted upon the arm 184 instead of providing the cutting edge 188 on this arm.

The arm 184 is normally rotated away from the wire 66 through the use of a coil spring 190 under tension attached to one end of this arm. An end of the spring 190 is attached to a rod 192 which is rigidly secured to the plate 28. If desired, the rod 192 may be secured by means of another coil spring 194 under tension to the arm 60 holding the clamping jaw 58 so as to normally bias this clamping jaw 58 in contact with the jaw 56 in order to firmly hold the wire 66 in position.

The various pivotally mounted arms forming a part of this wire feed unit 24, the fixed grip unit 96 and the movable grip unit 98 are actuated or moved by means of a series of cams attached to the shaft 20.

Figure 8:
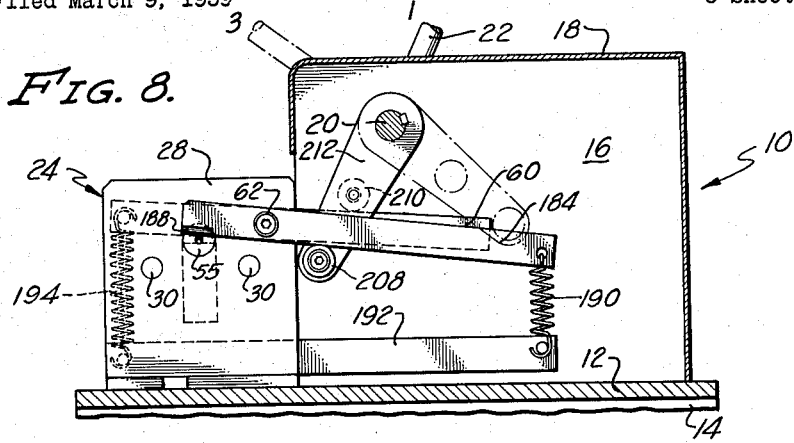
FIG. 8 is a cross-sectional view taken at line 8—8 of FIG. 4.

The arm 152 of the movable grip unit 98 is adapted to be rotated by means of an electrically insulated cam roller 200 (FIG. 10) attached to an arm 202 extending from the shaft 20 in order to move the electrode 156 away from the fixed jaw 150. The arm 134 is similarly adapted to be rotated by means of a cam roller 204 (FIG. 9) attached to an arm 206 extending from the shaft 20. The arms 184 and 60 are similarly adapted to be rotated by means of cam rollers 208 and 210, respectively, mounted on the arm 212 extending from the shaft 20 so as to engage the arms 60 and 184, respectively as indicated in FIG. 8 of the drawing.

Figure 2:
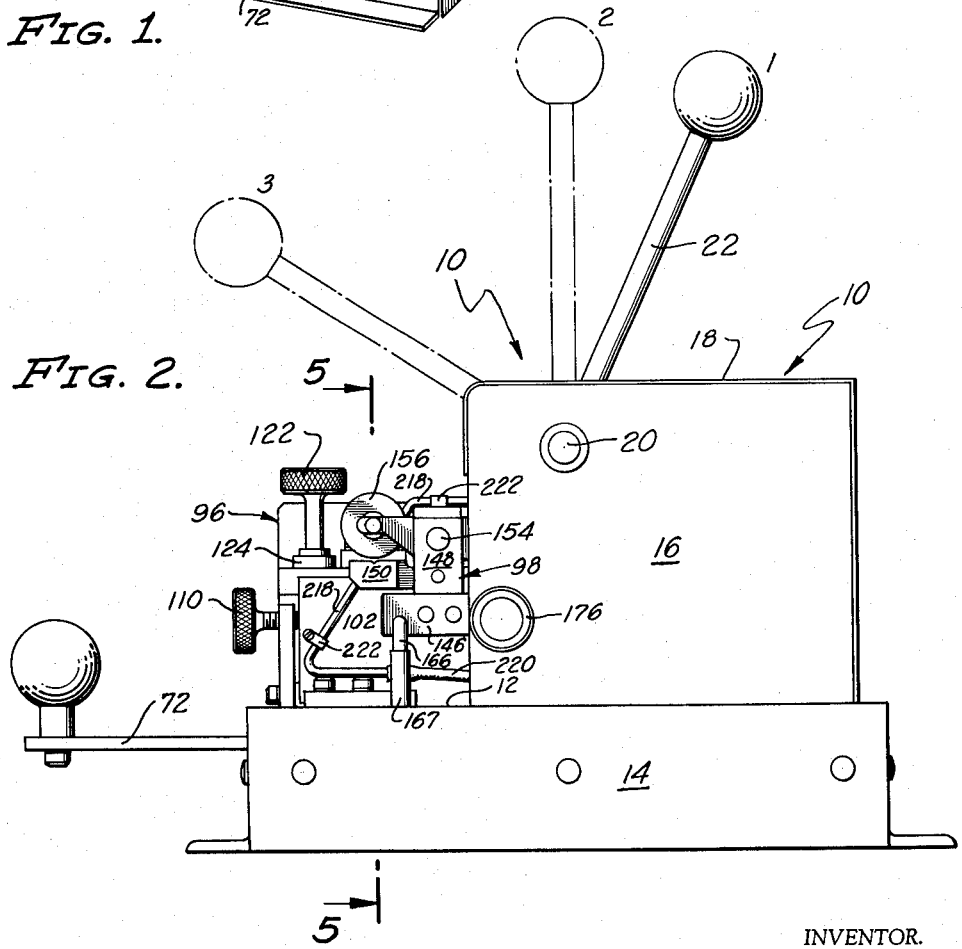
FIG. 2 is a side elevational view of this welder.

The shaft 20 also carries an actuating arm 214 (FIG. 7) which is designed to be rotated against a conventional push type valve 216 mounted on the cover 18 so as to actuate this valve and permit an inert gas to flow through conduits 218 (FIG. 9) from a supply line 220 to the area of the welder 10, where a weld is created. The conduit may be conveniently mounted by means of small brackets 22 (FIG. 2) as shown in the drawing.

*Operation*

In using the welder 10 the handle 22 and the wire feed lever 72 are both initially located in positions shown in full lines in the drawings. A wire, such as the wire 66, is then inserted along the path indicated in various figures of the drawings through the wire feed unit 24 so as to extend to the edge of the plate 28 adjacent to the fixed grip unit 96. Next, a member to be welded such as, for example, the member 162 previously described, is inserted in the position shown in FIG. 5 of the drawing in the notch 160 in the jaw 150. At this point the cam shaft lever or handle 22 is moved from the position indicated in FIG. 2 to the position 2 shown in phantom in FIG. 2. As this occurs, the arm 202 (FIG. 10) and the cam roller 200 are rotated away from the arm 152 so as to permit the spring 165 to rotate the arm 152 in order to securely clamp the member 162 in position shown beneath the electrode 156.

Figure 3:
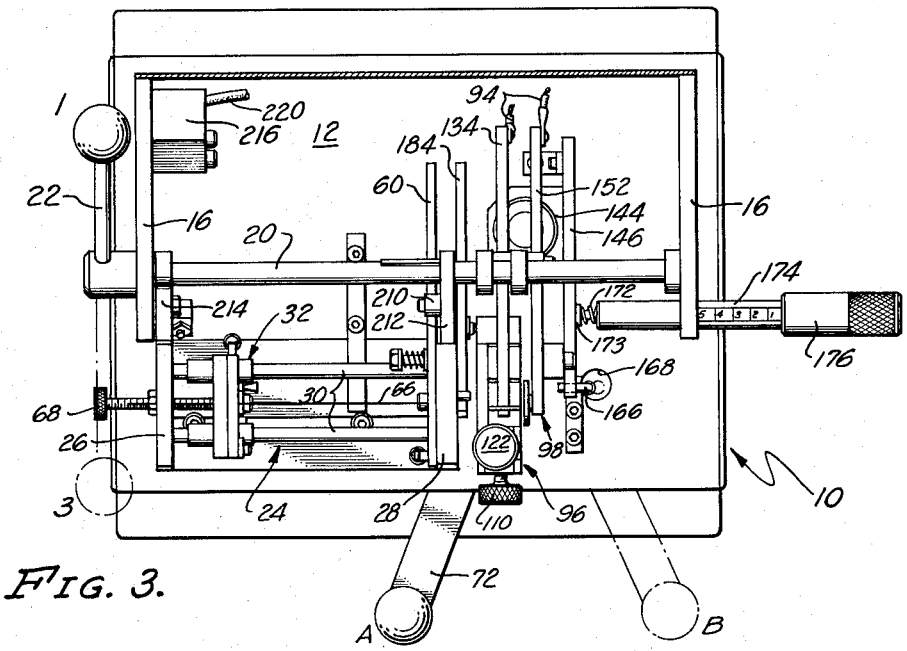
FIG. 3 is a top plan view of this welder with a cover removed.

At this point the wire feed lever 72 is moved from the position illustrated identified as "A" in FIGS. 3 and 6 of the drawings to the position shown in phantom in these same figures of the drawings and identified as position "B." The springs 82 hold the lever 72 in this position through the over center type of toggle action previously described. As the lever 72 is moved toward this position B the connected carriage 32 is pulled toward the plate 28 advancing the wire 66 into the fixed grip unit 96. The motion of the lever 72 also brings this lever into contact with the rod 166 so as to swing the movable grip unit 98 away from the fixed grip unit 96 against the force of the spring 172.

Next, during the use of the welder 10, the handle 22 is moved to the position 3 shown in phantom in FIGS. 2, 8, 9 and 10 of the drawings. This motion sequentially causes the arm 206 (FIG. 9) and the associated cam roller 204 to move away from the arm 134, allowing the spring 140 to rotate this arm 130 so as to clamp the wire 66 beneath the electrode 138. It also rotates the arm 212 (FIG. 8) so that the roller 210 disengages the arm 60, allowing the spring 194 to bring the jaw 58 toward the jaw 56 so as to securely clamp the wire 66 in position within the wire feed unit 24. Immediately after this occurs the cam roller 208 attached to the arm 212 engages the arm 184 so as to rotate this arm, causing the wire 66 to be severed at the end plate 28. Further, this rotation of the handle 22 causes the arm 214 to engage and actuate the valve 216, causing an inert gas, such as argon or the like to flow through the conduits 218.

Next the wire feed lever 72 is returned to its initial position. As this occurs the movable grip unit 98 is released so that the spring 172 urges the member 162 into contact with the end of the wire 66 held in the fixed grip unit 96. During this motion, of course, the rod 166 is disengaged. At this point the parts to be welded are held together by pressure from the spring 172 alone. As the lever 72 is further moved back to its initial position the end 86 of this lever engages the arm 88 so as to actuate the switch 90, permitting current to flow through the wires 94 to the wires 66 and the part 162. The time when such current flow is initiated depends upon the manner in which the switch 90 is constructed and adjusted. In general, current flows for a period of 2½–35 milliseconds, depending upon the nature of the power supply used causing the wire 66 to be welded to the part 162. It is important with the welder 10 that actuation of the switch 90 only triggers the welding current, and that therefore the welding is independent of the movement of the lever 72. This welding operation itself is only affected by the spring 172 once it commences.

Following these operations the handle 22 is returned to its initial position. This causes the arm 152 to be engaged by the roller 20 permitting removal of the welded member. It also causes the valve 116 to be shut off. Further it causes the arm 184 to be released and the arm 60 to be depressed so that the wire 66 is positively released. Further, the rotation of the handle 22 back to its initial position causes the arm 134 to be rotated so that the wire 66 welded to the member 162 may be removed.

In order to again use the welder 10 the series of operations previously indicated are repeated.

Those skilled in the art to which this invention pertains will realize that butt welders as herein shown and described are very efficient for the purpose intended and that they are very simple to use. They will further realize that with butt welders of the type indicated that the actual nature of the weld achieved is independent of the manner in which the welder 10 is manipulated during use so as to obtain the weld; because of the complex nature of this invention it is to be considered as being limited only by the appended claims forming a part of this disclosure.

I claim:

1. A butt welder which includes: a floor; fixed grip means secured to said floor, said fixed grip means including a jaw, a pivotally mounted arm, and an electrode secured to said arm; a bearing mounted on said floor; movable grip means mounted on said bearing so as to be capable of being rotated toward said fixed grip means, said movable grip means including a jaw, a pivotally mounted arm and an electrode mounted on said arm adjacent to said jaw; cam means for rotating said arms on said fixed grip means and said movable grip means so as to move said electrodes away from said jaws; separate spring means carried by said fixed grip means and said movable grip means, said spring means serving to normally rotate said arms so that said electrodes are against said jaws; and other spring means for rotating said movable grip means toward said fixed grip means.

2. A butt welder as defined in claim 1 wherein said cam means includes a shaft rotatably mounted above said floor and a separate cam roller engaging each of said arms, said cam rollers being mounted on said shaft.

3. A butt welder which includes: a floor, a wire feed unit mounted upon said floor, a fixed grip unit mounted on said floor adjacent to said wire feed unit, a movable grip unit movably mounted on said floor on the side of said fixed grip unit remote from said wire feed unit, said movable grip unit being capable of being moved to adjacent to said fixed grip unit, said wire feed unit including clamping means for holding a wire in a fixed position located adjacent to said fixed grip unit, means for severing a wire held by said clamping means, said means for severing being located on said wire feed unit, carriage means including means for holding wire, said carriage means being movably mounted in said wire feed unit, said carriage means being movable toward said fixed grip unit, an electrode movably mounted on said fixed grip unit, another electrode movably mounted on said movable grip unit, separate jaw means located on each of said grip units, said jaw means being aligned with one another when said movable grip unit is moved to adjacent to said fixed grip unit, said jaw means being aligned with said clamping means and said holding means and said carriage means in said wire feed unit when in said position, means for moving said electrodes so as to hold a wire in said fixed grip unit and a part in said movable grip unit, means for moving said movable grip unit to adjacent to said fixed grip unit, and means for moving said carriage means so as to transport a wire held by said means for holding a wire from said wire feed unit into said fixed grip unit.

4. A butt welder as defined in claim 3 including a bearing mounted on said floor and wherein said movable grip unit is mounted on said bearing so as to be capable of being rotated toward said fixed grip unit.

5. A butt welder as defined in claim 4 wherein said means for moving said movable grip unit to adjacent to said fixed grip unit includes spring means, said spring means resiliently bearing against said movable grip unit.

6. A butt welder as defined in claim 3 wherein said means for moving said electrodes include spring means connected to said electrodes so as to move said electrodes toward said jaw means and cam means for moving said electrodes in apposition to the motion of said electrodes caused by said spring means.

7. A butt welder which includes a floor, a wire feed unit mounted upon said floor, said wire feed unit including clamping means for holding a wire in a fixed position and wire advancing means for moving wire with respect to said clamping means, a fixed grip unit mounted on said floor adjacent to said clamping means on the side thereof remote from said wire advancing means, said fixed grip unit including a jaw and a movable electrode capable of being moved so as to hold a wire within said jaw on said fixed grip unit, a bearing mounted on said floor, a movable grip unit mounted on said bearing so as to be capable of being rotated to adjacent to said fixed grip unit on the side thereof remote from said wire feed unit, said movable grip unit including a jaw and a movable electrode capable of being moved toward said jaw in order to hold a part on said movable grip unit, spring means resiliently biasing said movable grip unit toward said fixed grip unit, separate spring means resiliently biasing each of said electrodes toward a corresponding jaw, a rotatably mounted shaft located above said floor, cam means for moving said electrodes away from said jaws mounted on said shaft, other cam means for actuating said clamping means mounted on said shaft, further cam means for rotating said movable grip unit away from said fixed grip unit mounted on said shaft, wire cutting means mounted adjacent to said clamping means, still further cam means for actuating said wire cutting means mounted on said shaft, and lever means connected to said wire advancing means for actuating said wire advancing means, switch means capable of being actuated by motion of said lever means, mounted on said floor, and separate conductor means for supplying current connected to said electrodes and to said switch means, and means for holding said movable grip unit away from said fixed grip unit attached to said lever means.

8. A butt welder as defined in claim 7 including an arm rotatably mounted on each of said grip units and wherein said electrodes are mounted on said arms and wherein said cam means engage said arms, and including spring means engaging said arms so as to hold said arms against said cam means.

9. A butt welder which includes: a floor; fixed grip means secured to said floor, said fixed grip means including a jaw and pivotally mounted arm; a bearing mounted on said floor; movable grip means mounted on said bearing so as to be capable of being rotated toward said fixed grip means, said movable grip means including a jaw and a pivotally mounted arm; cam means for rotating said arms on said fixed grip means and said movable grip means so as to move said arms with respect to said jaws so as to release articles on said fixed grip means and said movable grip means; separate spring means carried by said fixed grip means and said movable grip means, said separate spring means serving to normally rotate said arms so as to hold articles against said jaws; and another spring means for rotating said movable grip means toward said fixed grip means in order to place said articles in contact with one another; and electrode means for supplying current to said articles.

10. A butt welder which includes: a floor, a wire feed unit mounted upon said floor, a fixed grip unit mounted on said floor adjacent to said wire feed unit, a movable grip unit movably mounted on said floor on the side of said fixed grip unit remote from said wire feed unit, said movable grip unit being capable of being moved to adjacent to said fixed grip unit, said wire feed unit including clamping means for holding a wire in a fixed position located adjacent to said fixed grip unit, means for severing a wire held by said clamping means, said means for severing being located on said wire feed unit, carriage means, including means for holding wire, said carriage means being movably mounted in said wire feed unit, separate jaw means located on each of said grip units, said jaw means being aligned with one another when said movable grip unit is moved to adjacent to said fixed grip unit, said jaw means being aligned with said clamping means and said holding means and said carriage means in said wire feed unit when in said position, means for holding a wire in said fixed grip unit and a part in said movable grip unit, means for moving said movable grip unit to adjacent to said fixed grip unit, and means for moving said carriage means so as to transport a wire held by said means for holding a wire from said wire feed unit into said fixed grip unit, and electrode means forming a part of said movable grip unit and another electrode means forming a part of said fixed grip unit.

11. A butt welder which includes: a floor, a wire feed unit mounted upon said floor, a fixed grip unit mounted upon said floor adjacent to said wire feed unit, a movable grip unit movably mounted upon said floor on the side of said fixed grip unit remote from said wire feed unit, said movable grip unit being capable of being moved to adjacent to said fixed grip unit, said wire feed unit including clamping means for holding a wire in fixed position located adjacent to said fixed grip unit, carriage means including means for holding wire, said carriage means being movably mounted in said wire feed unit, said carriage means being movable toward said fixed grip unit, an electrode movably mounted on said fixed grip unit, another electrode movably mounted on said movable grip unit, separate jaw means located on each of said grip units, said jaw means being aligned with one another when said movable grip unit is moved to adjacent to said fixed grip unit, said jaw means being aligned with said clamping means and said holding means and said carriage means in said wire feed unit when in said position, means for moving said electrodes so as to hold a wire in said fixed grip unit and a part in said movable grip unit, means for moving said movable grip unit to adjacent to said fixed grip unit, and means for moving said carriage means so as to transport a wire held by said means for holding a wire from said wire feed unit into said fixed grip unit.

References Cited in the file of this patent

UNITED STATES PATENTS

| | | |
|---|---|---|
| 1,344,961 | Remington | June 29, 1920 |
| 2,018,379 | Pfeiffer | Oct. 22, 1935 |
| 2,122,941 | Hufler et al. | July 5, 1938 |
| 2,202,580 | Hahn | May 28, 1940 |
| 2,409,636 | Little | Oct. 22, 1946 |